Jan. 7, 1969 W. ULRICH 3,420,957

DIAL PULSE SCANNING IN A PROGRAM-CONTROLLED TELEPHONE SYSTEM

Filed Nov. 13, 1964 Sheet 1 of 4

INVENTOR
W. ULRICH
BY John C Albrecht
ATTORNEY

United States Patent Office 3,420,957
Patented Jan. 7, 1969

3,420,957
DIAL PULSE SCANNING IN A PROGRAM-CONTROLLED TELEPHONE SYSTEM
Werner Ulrich, Colts Neck, N.J., assignor to Bell Telephone Laboratories, Incorporated, New York, N.Y., a corporation of New York
Filed Nov. 13, 1964, Ser. No. 410,904
U.S. Cl. 179—18 23 Claims
Int. Cl. H04m *3/00*

ABSTRACT OF THE DISCLOSURE

Circuitry is disclosed which decreases the amount of time required to scan for dial pulses in an electronic program-controlled telephone switching system. Lines are scanned to detect service requests and sevice requesting lines are assigned an originating register in memory. Simultaneously, the line is connected through the switching network to one of a plurality of dial pulse detectors. Each dial pulse detector is assigned to a unique originating register in memory and the detectors, rather than the lines, are scanned for dial pulses which are entered into the corresponding originating register. Successive detectors are assigned to successive originating registers, enabling a group of detectors to be scanned together in order to update a group of originating registers.

This invention relates to telephone switching systems and more particularly to arrangements for accumulating call signaling information occurring on a subscriber line.

In a telephone switching system connections are established in accordance with call signaling information generated by a subscriber by means of a rotary dial, keyset, card dialer, etc. The call signaling information, in common control telephone switching systems, must be registered and interpreted in order to establish the proper connections. In prior art electromechanical common control telephone switching systems, such as crossbar, physical originating registers are assigned and connected to a calling line after a service request has been detected. The calling line is connected through the switching network to an originating register and the call signaling information generated by the subscriber is transmitted through the switching network and accumulated in the register. After significant portions of the information have been registered, the common control interprets the information to determine the desired paths to be established through the telephone switching system.

In electronic program-controlled telephone switching systems such as the one disclosed in Patent No. 2,955,165 of W. A. Budlong et al., issued Oct. 4, 1960, a different approach is taken. A service request is detected by scanning the subscriber lines under control of a service request line scan program subroutine. When the request for service is first detected call signaling information is accumulated by means of a dial pulse scanning program subroutine. The calling line is not connected through the switching network to a physical register. Instead, the calling line itself is scanned for dial pulses. There are two different scanning sequences. The first is a service request scan sequence which controls the scanning of the subscriber lines for service requests. The rate of this scan is relatively slow, e.g., once every 100 milliseconds. The rate of the dial pulse scan is greater, e.g., once every 10 milliseconds, since it is necessary to scan at a much faster rate in order to avoid missing a dial pulse. The call signaling information is accumulated in the locations of a temporary memory. A group of these locations is termed an originating register since it serves certain of the functions of the physical registers in a system such as the No. 5 Crossbar system. The dial pulse scan program controls the scanning of each line which has previously requested service. Dial pulses are detected and the assigned originating register in memory is up-dated. The dial pulse scan program controls the addressing of an individual line to which a particular originating register in memory has previously been assigned. The line is not connected through the switching network to a physical register, and the call signaling information is determined instead by scanning the line itself.

In the copending application of A. H. Doblmaier et al. Ser. No. 334,875, filed Dec. 31, 1963, there is disclosed a program-controlled electronic telephone switching system. One of the many advantages of this system is that lines are scanned in groups for service requests. Sixteen lines are scanned simultaneously to detect requests for service. If one or more of the lines scanned are off-hook, one or more originating registers in memory are assigned to them for accumulating call signaling information. The advantage of this group scanning is that a considerably smaller fraction of the total real time of the central control is spent in scanning for service requests since sixteen lines are scanned simultaneously. My present invention, which is also disclosed in the Doblmaier et al. application, is an arrangement whereby sixteen lines may be scanned simultaneously for dial pulses.

It is a general object of this invention to provide an improved arrangement for accumulating call signaling information in a program-controlled telephone switching system.

It is a more specific object of this invention to provide a scanning arrangement for a program-controlled telephone switching system for enabling a group of lines to be scanned simultaneously for call signaling information.

The present invention is disclosed in the Doblmaier et al. application and such disclosure is hereby incorporated herein. The present disclosure is designed to focus on the problem encountered when it is attempted to scan lines in groups for dial pulses and the arrangement I have discovered for solving it.

In general, in order to scan a group of lines for service requests it is necessary to form a word, each bit of which represents the state of a respective line. For example, the off-hook condition of a line, which exists when the line first requests service, may be represented by a 0, with the on-hook condition being represented by a 1. A 16-bit word may be formed, each bit of which represents the state of one of 16 successive lines. In the Doblmaier et al. system an address is sent to the line scanner, the scanner then examining the states of the 16 lines identified by the address and forming a 16-bit word. The 16-bit word is then compared with the scan word derived during the previous cycle. A change in any bit value from a 1 to a 0 indicates a request for service. The program-controlled central control then transfers to various subroutines to handle those lines requesting service. The particular lines requiring this further processing are determined by the positions in the scan word whose bit values have changed. The new scan word is then stored in the memory to be compared with the scan word derived in the next scanning cycle.

The Budlong et al. approach to detecting service requests by means of a program-controlled line scan is thus incorporated in the Doblmaier et al. system, with the important difference that all of the lines in a group of 16 are scanned simultaneously for service requests. While groups of lines thus may be scanned for service requests it is more difficult to use the Budlong et al. technique for scanning all of the lines in a group for dial pulses. The central control knows which lines require dail pulse scanning because the respective line identities are contained in the assigned orignating registers. (An originating register in the temporary memory is assigned to each line when it first requests service.) Suppose it is desired to scan for dial pulses the 16 lines associated with 16 successive originating registers. The first originating register in the group contains a line identity. If only this line identity is transmitted to the scanner it is not possible to scan 16 lines for dial pulses. The other 15 lines, to which are assigned the other 15 originating registers in the group, are not necessarily in sequence. Transmitting the identity of one line to the line scanner in no way identifies the other 15 lines which are associated with the other 15 originating registers in the group. If only one line identity may be transmitted to the line scanner at a time it is apparent that dial pulse scanning must be on a per line basis. In fact, this is the case in the above-identified Budlong et al. patent.

Were there a number of originating registers equal to the number of subscriber lines, each originating register being uniquely assigned to a respective line, it would be possible to scan a group of lines for dial pulses. The 16-bit "answer" word from the scanner would be used to up-date the 16 respective originating registers. Only one address would have to be transmitted to the line scanner since the scanner would then scan 16 successive lines. This solution is impractical, however, because the capacity of the call store would have to be materially increased, and because a great deal of time would be wasted in the frequent scanning of the line. The number of originating registers, i.e., locations in memory, used in a program-controlled telephone switching system are advantageously determined in accordance with traffic requirements. The number of originating registers is dependent upon the maximum number of lines which may transmit call signaling information at the same time. It is undesirable to increase the speed of the central conrtol at the expense of cost if another method is available to scan groups of lines for dial pulses.

In accordance with the principles of my invention a series of dial pulse or call signal receivers is provided at the trunk terminal end of the switching network, the receivers being connectable to the subscriber lines through the switching network. The number of these receivers depends upon the maximum number of lines ever transmitting call signaling information at a single time during a busy hour. A scanner is used to scan these receivers for deriving a scan or answer word under command of the central control. In the memory there are a number of originating registers equal to the number of dial pulse receivers. These originating registers are uniquely assigned to respective dial pulse receivers on a one-to-one basis.

Scanning for service requests proceeds as described above. An address is transmitted to the line scanner and 16 lines themselves are scanned for service requests. The answer word sent back to the central control determines which new lines are requesting service. One of the dial pulse receiver-originating register pairs is assigned to each of these new lines and the respective line identity is written in the register.

In the dial pulse scan sequence the line scanner is not used. Instead, the central control transmits an address to a scanner which is associated with the trunks. This address identifies a group of 16 successive receivers. The answer word transmitted back to the central control is used to up-date the 16 uniquely assigned originating registers. Only one address is required to identify 16 receivers since a unique group of 16 receivers is associated with the 16 originating registers under consideration, whose contents are to be up-dated. In fact, to scan for dial pulses the line identities in the originating registers are not even required. The originating registers are operated upon in sequence in groups of 16. They are up-dated in accordance with the answer word derived by the scan of the 16 respective dial pulse receivers. A line identity is not required to up-date an originating register since the dial pulse information for the originating register is determined from the respective dial pulse receiver. Only after an originating register contains the call signaling information required to establish a call, or part of it, is the line identity required. At this time, the central control examines the line identity stored in the originating register and establishes a switching connection to the line in accordance with the call signaling information contained in the register. The line identity is not required during the dial pulse scan sequence itself.

It is a feature of this invention to provide call signal receivers in a program-controlled telephone switching system, the call signal receivers being connectable through the switching network to the subscriber lines.

It is another feature of this invention to uniquely assign originating registers in the temporary memory to respective ones of the call signal receivers.

It is still another feature of this invention, in the illustrative embodiment thereof, to scan a group of call signal receivers simultaneously to form a scan word and to up-date the respective originating registers in accordance with this word.

Further objects, features and advantages of the invention will become apparent upon consideration of the following detailed description in conjunction with the drawing in which.

Figure 1:
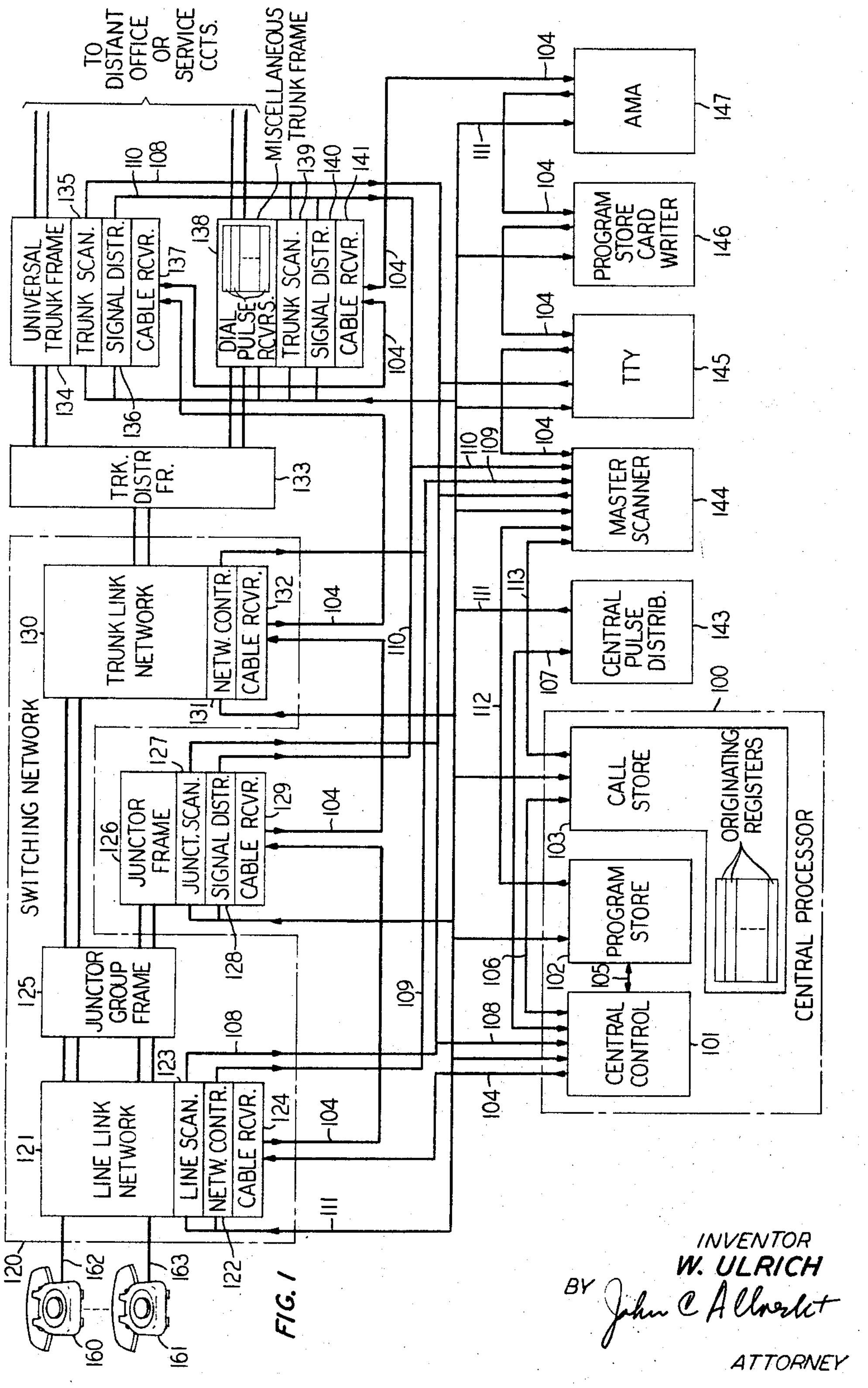
FIG. 1 is a general block diagram of the switching system disclosed in the Doblmaier et al. application with the locations of the originating registers and call signal receivers shown emphasized.

The functional designations employed in FIG. 1 are broadly descriptive of the tasks assigned each block of the figure. The central processor 100 may be divided into three basic elements. Program store 102 contains the less volatile system information including the system programs, translation information and class of service information. Information is written into program store 102 by means of program store card writer 146. Call store 103 contains the more volatile system information such as call signaling information, recent changes in class of service information, subscriber and trunk busy-idle information, and network path busy-idle information. Central control 101 operates in accordance with the words contained in the program store and functions to control the operation of all of the units in the system. Consequently, action performed by the central control includes examination and up-dating of the call store, scanning of lines, trunks and signal receivers, deriving network paths and establishing connections through the switching network, etc.

Communications between major divisions of the system are by way of bus systems and by way of multiple conductor cables which provide discrete communication paths between selected divisions of the system. For example, an address is transmitted to one of the scanners over one bus system. The answer word derived by the scanner is transmitted to the central control over another bus system.

Switching network 120 serves to selectively interconnect lines to lines via junctor circuits, lines to trunks, trunks to trunks, lines and trunks to tones, signal transmitters, signal receivers, maintenance circuits, and, in the case of lines, to provide connections to coin supervisory circuits, etc. Central processor 100 maintains a record of the busy and idle states of all network links and a record of the make-up of every established or reserved path through the network. By examining this information contained in the call store, central control 101 determines the switching requirements for any call and controls the operation of the switching network in the requisite manner. Commands from the central control are sent to the cable receivers in the switching network. The respective network controllers control the execution of the desired functions. The network scanners in response to commands from the central processor transmit to the central control information indicative of the supervisory states of selected groups of circuit elements. The network signal distributors provide operate or release signals to operate or release control relays in junctor circuits, trunk circuits and service circuits in response to commands received.

The subscriber sets such as 160 and 161 are standard sets as are incorporated in present-day telephone switching systems. They may be arranged to transmit either dial pulses or TOUCH-TONES. Information concerning the type of call signaling apparatus associated with a subscriber line is included in the program store 102. After a recent change this information is found in part in the call store 103. Supervision of a subscriber line is by way of the line scanners which are located in the vicinity of a line link network. As will be described below the line scanners are generally employed only to detect requests for service.

Service circuits and subscriber information circuits, such as busy and ringing tone circuits, are terminated at trunk terminals of the trunk link network. Communication with a distant office is by way of trunk circuits which are similarly connected to the trunk terminals of the trunk link network.

The central pulse distributor 143 is the means whereby a particular piece of equipment such as a network controller is momentarily enabled to receive a command from the central control 101. The master scanner 144 comprises a matrix of supervisory circuits and means for selectively transmitting to central control 101 the supervisory states of a selected group of supervisory circuits in response to a command from tthe central processor. The master scanner is employed to supervise certain circuit elements which reflect the operating state of the system, such as voltage levels of critical voltage supplies. The master scanner is also employed to monitor a few circuits which terminate on the switching network 120 and which for efficiency of grouping are more conveniently examined by way of the master scanner 144 than by way of line, junctor, or trunk scanners. Prominent among such circuit elements are the supervisory terminals of the subscriber dial pulse receivers.

The Teletype unit 145 is a means for communicating information between maintenance personnel and the switching system. The message accounting tape unit 147 is utilized by the system to store telephone charging information.

Figures 2, 2A:
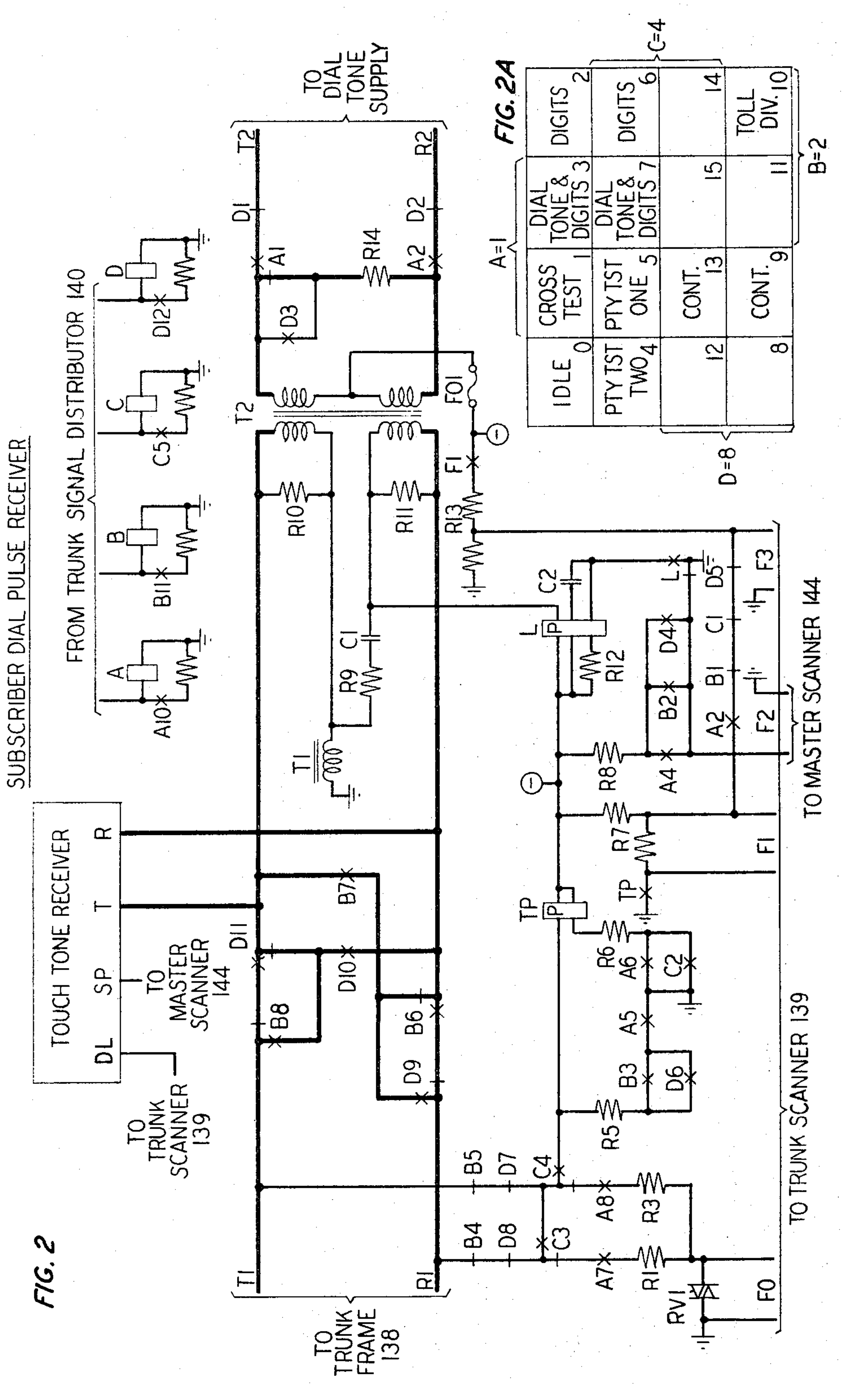
FIGS. 2 and 2A are basically the same as FIGS. 102 and 102A of the Doblmaier et al. application, FIG. 2 being a schematic representation of a subscriber dial pulse receiver, a plurality of receivers of this type being included in the miscellaneous trunk frame in FIG. 1, and FIG. 2A showing the operating states of the receiver under various conditions.

In FIG. 2 there is shown the details of one of the many subscriber dial pulse receivers included in the system. These units are also termed call signal receivers. A plurality of these receivers are connectable through the switching network to the subscriber lines and the central control establishes a connection between one of the receivers and a line requesting service. The line is connected through line link network 121, junctor group frame 125, and trunk link network 130 to the call signal receiver. The switching path is determined by central control 101 by examining the busy-idle states of the links in the networks, busy-idle state words being contained in call store 103.

Each subscriber dial pulse receiver serves in a variety of capacities, some of which are supervisory. If the subscriber having requested service is provided with TOUCH- TONE facilities, the central control, after having determined this information from the program store, connects the subscriber to a combined dial pulse and TOUCH-TONE receiver. The trunk signal distributor controls the operation of relays A, B, C and D to define the different operating states of the receiver. In accordance with the table of FIG. 2A, which is the same as the table of FIG. 102A in the Doblmaier et al. application, the supervisory state of the dial pulse receiver is determined by the master scanner matrix when this unit is addressed by the central control and central pulse distributor.

The particular circuitry of the receiver forms no part of my present invention and reference may be made to the Doblmaier et al. application for a detailed description thereof.

The combined dial pulse TOUCH-TONE receiver serves to provide transmission path cut-through, provide for a power cross test of the subscriber's loop, provide D-C loop supervision, etc. With the four control relays A, B, C and D it is possible to define 16 separate operating states. As seen in FIG. 2A, only 11 of these states are required. Relays A, B, C and D are given the binary weights 1, 2 4 and 8, respectively, and thus each operating state may be identified as shown in the table by one of the numbers 0–15. The idle state 0 exists when none of the four relays is operated. The relays themselves are operated by the trunk signal distributor 140 under command of the central control. The various operating states are described in the Doblmaier et al. application. Depending on the state of the receiver various ones of ferrods F0, F1 and F2 in the master scanner are operated. (F3, in the trunk scanner, is employed to check operation of relay A and alternatively is employed as an alarm indication associated with the fuse F01.) When trunk signal distributor 140 energizes relays A and B dial tone is applied to the subscriber requesting service. After the first dial pulse is detected, the central control causes the receiver to assume state 6 and in this state the L relay operates only if there is a loop at the subscriber's line. By scanning ferrod F2 dial pulses may be detected since the ferrod follows the dial pulses.

If the subscriber station is equipped with a TOUCH-TONE set the call signaling information is transmitted in the form of coded tones rather than successive opens and closures of the subscriber loop. The combined dial pulse and TOUCH-TONE receiver assigned to the line is arranged to provide a signal on the signal present conductor SP which terminates at a supervisory element in the master scanner. The central control by way of the master scanner scans the signal present scan points associated with a plurality of dial pulse receivers and if it is determined that a signal is present in a particular combined dial pulse and TOUCH-TONE receiver, central control 101 directs trunk scanner 139 to scan the supervisory points associated with the digit leads DL of the combined dial pulse and TOUCH-TONE receiver. Information derived from the rigit leads, like dial pulse call signaling information, is stored in call store 103 and generally the call proceeds in the same manner as a dial pulse call. The major difference between the two types of calls is that if the subscriber is provided only with the ordinary dial pulse mechanism the call signaling information is completely determined only by the master scanner. If the subscriber is provided with TOUCH-TONE signaling equipment the call signaling information is derived by the cooperation of the master scanner and the trunk scanner. (The use of the master scanner, rather than the trunk scanner, for scanning for dial pulses and signal present conditions is advantageous because any group of 16 combined dial pulse and TOUCH-TONE receivers scanned together need not be in the same frame.) Throughout the description that follows in connection with the accumulation of call signaling information the master scanner will be the one which is described as detecting the information. It is to be borne in mind that if TOUCH-TONE facilities are provided the trunk scanner is employed as well.

Figure 3:
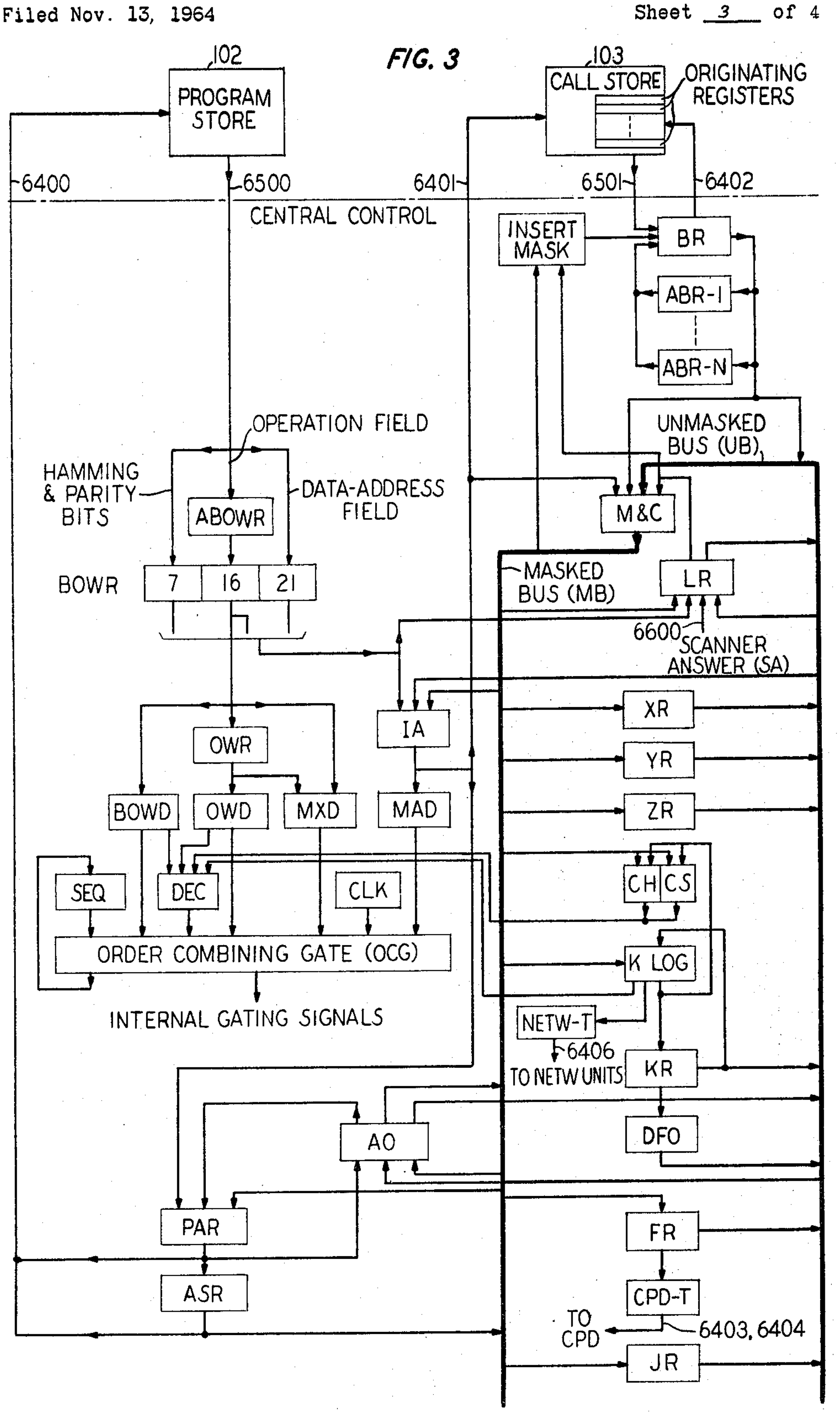
FIG. 3 is basically the same as FIG. 9 of the Doblmaier et al. application and is a simplified schematic representation of the central control 101 in FIG. 1.

A more detailed block diagram of central control 101 is shown in FIG. 3. The central control is connected to both the program and call stores. Successive addresses are transmitted to the program store 102 to derive instruction words for controlling the operation of the central control. Addresses are also transmitted to the call store 103 for purposes of either reading or writing information in this unit. The central control in addition to performing operations on data words also derives control signals and transmits them to the various units in the system.

The operation of the central control is not necessary for an understanding of the present invention. FIG. 3 is shown mainly for the purpose of describing the function of the LR register. When one of the scanners in the system is addressed and controlled to scan a supervisory element, or a group of supervisory elements, the scanner answer is returned along the scanner answer bus system and stored in the LR register. Once the scan, or answer, word is stored in the LR register the central control examines it to determine subsequent machine operation. For example, a group of 16 lines may be scanned for service requests as described above. The 16-bit answer word is stored in the LR register. The central control then reads the answer word derived for the same 16 lines during the previous service request scan. This previously derived word is read out of the call store and compared with the present scanner answer in the central control. If any one of the 16 bit values has changed a transfer is effected to the appropriate subroutine. In addition, the scanner answer in the LR register is written in the call store and replaces the previous answer word stored therein. The new scanner answer is subsequently used for comparison purposes with the next scanner answer derived from the scan of the same 16 lines.

Suppose it is desired to scan the lines themselves for dial pulses and to scan 16 lines at a time. Sixteen originating registers will be examined in a single step. The identities of the 16 lines to which the 16 originating registers are assigned are contained in the originating registers. But there is no single address which may be transmitted to line scanner 123 to identify the 16 lines which must be scanned to derive the 16-bit answer word. The 16 lines are not necessarily grouped together and cannot be identified by a single address. This is due to the fact that originating registers are assigned to lines as they request service. The assignment is arbitrary and there is no one-to-one correspondence between lines and originating registers. Since only one address may be transmitted to line scanner 103 at a time it is not possible to control the up-dating of 16 originating registers simultaneously. Only one line could be scanned for dial pulses at a time were the lines themselves scanned.

However in accordance with my invention it is possible to up-date the 16 originating registers by means of a single scan. To accomplish this objective I provide the dial pulse receivers described above and shown in the miscellaneous trunk frame 138 in FIG. 1. When a line requests service it is connected through the switching network to a dial pulse receiver. Dial pulse scanning proceeds by scanning the dial pulse receivers rather than the lines themselves. As will now be described this enables call signaling information to be accumulated for 16 lines by means of a single scan.

Figure 4:
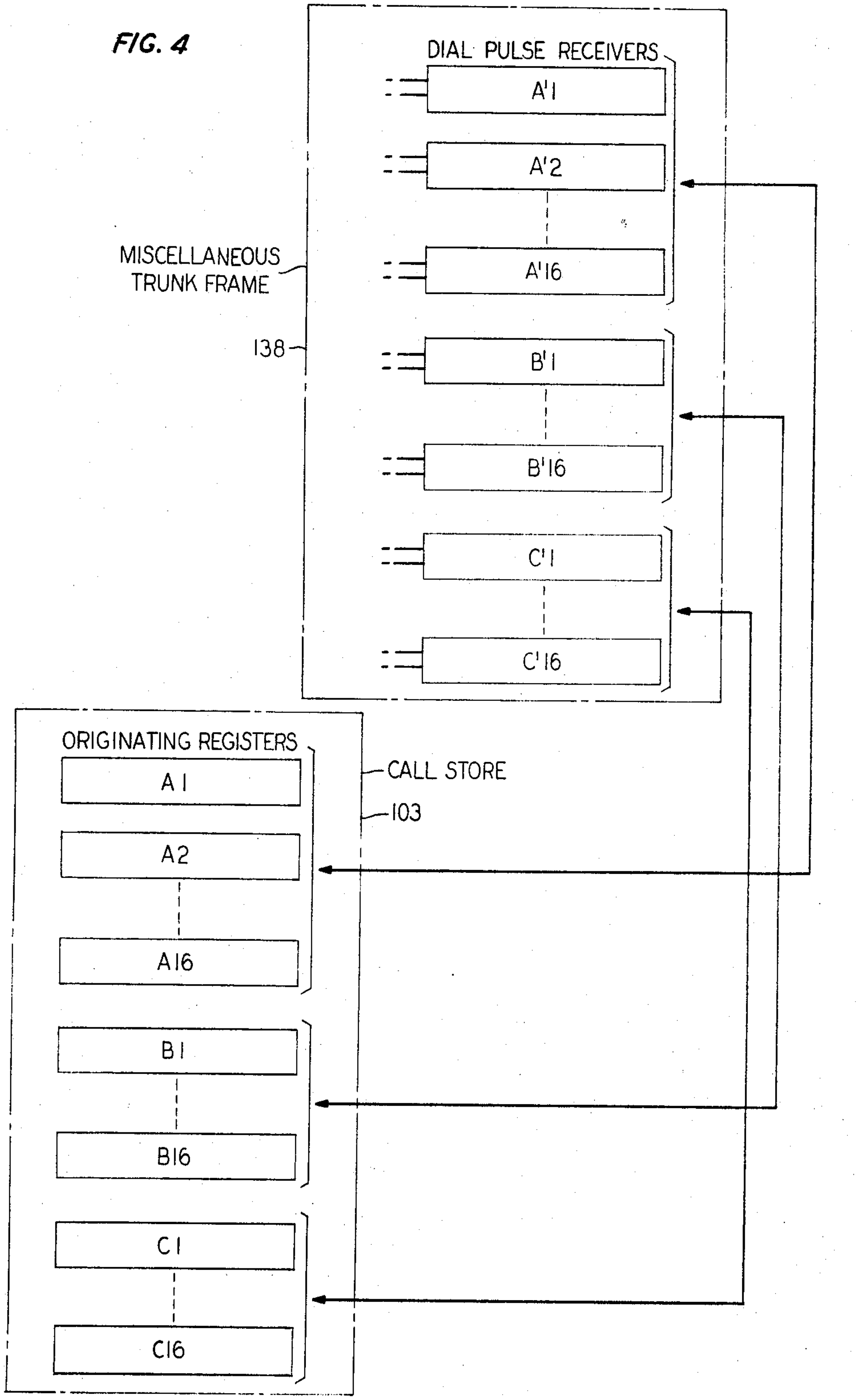
FIG. 4 illustrates the unique assignment of originating registers in the call store 103 to the subscriber dial pulse receivers on a one-to-one basis in accordance with an aspect of my invention.

Group scanning is possible because each originating register in the call store (FIG. 1) is uniquely and permanently assigned to a respective one of the dial pulse receivers. This is shown symbolically in FIG. 4. Three groups of 16 dial pulse receivers each are shown, all of the dial pulse receivers being within the miscellaneous trunk frame of FIG. 1. Three groups of originating registers, 16 registers in each group, are shown in the call store. The first group of dial pulse receivers, A'1 through A'16, are uniquely associated with the first group of originating registers, A1 through A16. For example, dial pulse receiver A'2 is permanently associated with originating register A2. Similar remarks apply to the dial pulse receivers and the originating registers in the B and C groups. The system may include more than three groups. But there is always an identical number of dial pulse receivers and orginating registers. The permanent association of the dial pulse receivers and the originating registers is shown symbolically by the brackets and arrows in the drawing.

The permanent association of dial pulse receivers and originating registers is achieved in the following manner. Each block of 16 originating registers includes a scanner address. This address is actually a number permanently maintained in the call store within the block of originating registers. When the central control operates on a particular group of 16 originating registers, the central control examines the registers for the associated scanner address and transmits this address to master scanner 144. This address then controls the scanning of the 16 dial pulse receivers associated with the 16 originating registers to be up-dated. Thus the unique assignment of dial pulse receivers to originating registers is actually controlled by storing in each block of 16 originating registers the address of the assigned receivers. The program for up-dating originating registers includes instructions for transmitting the address contained in the originating registers to the trunk scanner.

Line scanning for service requests proceeds as described above. When an originating register is first assigned to a line requesting service the line identity is stored in the originating register. The central control causes the switching network to connect the line to the dial pulse receiver which is permanently associated with the originating register assigned to the line. The central control is able to determine the identity of the dial pulse receiver to be connected to the line in the following manner. The originating register which is selected is in a group of 16. The 16 originating registers contain the address which is used to control the scanning of the 16 respective receivers. Suppose the fourth originating register in the group is assigned to the line requesting service. The dial pulse receiver to be connected to the line is thus the fourth in the group which is identified by the scanner address contained in the block of originating registers. Once the central control knows the identity of the dial pulse receiver to be connected to the line it determines a path through switching network 120 to connect the line to the assigned receiver.

Dial tone is returned to the subscriber from the receiver and the subscriber begins dialing. Dial pulses received by the receiver cause associated supervisory scan points in the master scanner to change state at a maximum rate of once every fifty milliseconds. For this reason the dial pulse receiver scan points must be scanned often, e.g., at a ten millisecond rate. During the course of executing the dial pulse scan subroutine the central control operates on originating registers A1 through A16. It is now possible to operate on the 16 originating registers in a single scan. The address sent to the master scanner is that identifying the 16 dial pulse receivers A'1 through A'16. The 16-bit word formed by the master scanner reflects the state of each dial pulse receiver supervisory scan point, i.e., whether or not a dial pulse has been received by the respective receiver. This 16-bit word is returned to the LR register in the central control and each of originating registers A1 through A16 is up-dated in accordance with a respective bit in the scanner answer word. The central control then operates on originating registers B1 through B16. Again, only a single address need be transmitted to the master scanner, the address identifying the scan points in the master scanner which are associated with dial pulse receivers B'1 through B'16. The single 16-bit scanner answer word enables the 16 originating registers B1 through B16 to be up-dated. This sequence continues with each group of originating registers being up-dated once every ten milliseconds.

It should be noted that in my arrangement it is not necessary to address a line during the dial pulse scanning. call signaling information stored in said central control to examine the 16 line identities contained in the 16 originating registers being operated upon. The originating registers are up-dated in accordance with information contained in respective dial pulses receivers. This up-dating in no way depends upon the particular lines to which the dial pulse receivers are connected. The only time the central control must examine a line identity sorted in an originating register is when sufficient call signaling information has been accumulated to establish a call. At this time the line identity contained in the originating register is used to determine which line has originated the signaling information stored in the same originating register.

In the illustrative embodiment of my invention 16 dial pulse (call signal) receivers are scanned simultaneously. My arrangement for providing dial pulse receivers and permanently assigning a unique originating register to each dial pulse receiver would be advantageous even if the central control were to operate on a per line basis. In the Budlong et al. system described above each line is scanned individually for dial pulses. The address which must be transmitted to the line scanner must identify one of many lines. By using dial pulse receivers and uniquely associated originating registers, to up-date an originating register the address transmitted to the master scanner must only identify one of the dial pulse receivers. Since there are far fewer dial pulse receivers in the telephone system than there are subscriber lines the addressing of the master scanner may be both simpler and faster.

Although the invention has been particularly described with respect to one specific embodiment thereof, it is to be understood that the above-described arrangement is merely illustrative of the principles of the invention. Numerous modifications may be made therein and other arrangements may be devised without departing from the spirit and scope of the invention.

What is claimed is:

1. A telephone switching system comprising a plurality of lines, a central control, a program store, a call store, a plurality of call signal receivers, certain locations in said call store comprising originating registers each permanently associated with a respective one of said call signal receivers, means responsive to a first program subroutine executed by said central control for scanning simultaneously a group of said lines for service requests, a switching network responsive to a second program subroutine executed by said central control for connecting any line requesting service to one of said call signal receivers, and means responsive to a third program subroutine executed by said central control for scanning simultaneously a group of said call signal receivers to detect call signaling information transmitted to said call signal receivers from the connected lines, said central control being operative to store the call signaling information detected in any group of said call signal receivers in the respective ones of said permanently associated originating registers.

2. A telephone switching system comprising a plurality of lines, a central control including a reegister, a program store, a call store, a plurality of call signal receivers, certain locations in said call store comprising originating registers each permanently associated with a respective one of said call signal receivers, means responsive to a first program subroutine executed by said central control for scanning simultaneously a group of said lines for service requests and for storing in said central control register information indicative of said service requests, a switching network responsive to a second program subroutine executed by said central control in accordance with the information stored in said central control register for connecting any line requesting service to one of said call signal receivers, and means responsive to a third program subroutine executed by said central control for scanning simultaneously a group of said call signal receivers to detect call signaling information transmitted to said call signal receivers from the connected lines and for storing said call signaling information in said central control register, said central control being operative to write the call signaling information stored in said central control register in the respective ones of said permanently associated originating registers.

3. A telephone switching system in accordance with claim 2 wherein the service request information stored in said central control register by said line scanning means is a data word each bit of which represents service request information of a respective one of the lines scanned and said call signaling information stored in said central control register by said call signal receiver scanning means is a data word each bit of which represents call signaling information contained in a respective one of the call signal receivers scanned.

4. A program-controlled telephone switching system comprising a plurality of lines, a central control, a plurality of call signal receivers each selectively connectable to a line requesting service, a temporary store including a plurality of originating registers each permanently associated with a respective one of said call signal receivers, and means together with said central control for writing call signaling information in a group of said originating registers, said writing means including means for scanning for call signaling information the group of call signal receivers with which said group of originating registers is permanently associated.

5. In a telephone switching system the combination comprising a plurality of lines, a plurality of call signal receivers, a word-organized memory system, certain word locations in said memory system comprising originating registers each permanently associated with a respective one of said call signal receivers, means for scanning a group of said lines for service requests, switching network means for connecting any line requesting service to one of said call signal receivers, means for scanning a group of said call signal receivers to form a scan word representative of the call signaling information contained in all of the call signal receivers in the group, and means for up-dating the originating registers permanently associated with the scanned call signal receivers in accordance with the scan word formed by said call signal receiver scanning means.

6. In a program-controlled telephone switching system the combination comprising a plurality of lines, a plurality of call signal receivers, a word-organized memory system, certain word locations in said memory system comprising originating registers each permanently associated with a respective one of said call signal receivers, a first scanner for scanning said lines for service requests, a switching network for selectively connecting a line requesting service to one of said call signal receivers, a second scanner for scanning said call signal receivers for call signaling information, said second scanner scanning a group of said call signal receivers simultaneously, and means for up-dating in groups the originating registers permanently associated with any group of said call signal receivers scanned by said second scanner.

7. In a program-controlled telephone switching system the combination comprising a plurality of lines, a plurality of call signal receivers a switching network for selectively connecting a line requesting service to one of said call signal receivers, a word-organized memory system, certain word locations in said memory system comprising originating registers with one of said originating registers being assigned to each line requesting service, the originating register assigned to a line requesting service being permanently associated with the respective call signal receiver connected to the same line through said switching network, and means for scanning said call signal receivers for call signaling information and for storing said information in the respective permanently associated originating registers.

8. In a program-controlled telephone switching system the combination in accordance with claim 7 wherein said last-mentioned means simultaneously scans a group of said call signal receivers for storing call signaling information in the respective group of said originating registers.

9. A program-controlled telephone switching system comprising a plurality of lines, a plurality of originating registers, a plurality of call signal receivers each permanently associated with a respective one of said originating registers, means for connecting a line requesting service to one of said call signal receivers, and means for up-dating said originating registers, said up-dating means including means for examining the call signaling information contained in said call signal receivers and means for operating upon information contained in said respective originating registers in accordance with the information derived by said examining means.

10. A program-controlled telephone switching system in accordance with claim 9 wherein said examining means simultaneously examines the call signaling information contained in groups of said call signal receivers and examines groups of said call signal receivers sequentially.

11. A program-controlled telephone switching system in accordance with claim 10 wherein the identity of each group of said call signal receivers is contained in the respective group of said originating registers and said examining means determines the identity of the group of call signal receivers to be examined for operating upon information contained in any of said respective groups of originating registers in accordance with the call signal receiver group identity contained in said any group of originating registers.

12. In a program-controlled telephone switching system the combination comprising a plurality of lines, a plurality of call signal receivers, means for connecting one of said call signal receivers to a line requesting service, a plurality of originating registers each permanently associated with a respective one of said call signal receivers, and means for simultaneously transferring call signaling information from a group of said call signal receivers to a respective group of said originating registers.

13. In a program-controlled telephone switching system the combination in accordance with claim 12 wherein the identity of each group of said call signal receivers is contained in the respective group of said originating registers and said transferring means determines the identity of a group of call signal receivers whose call signaling information is to be transferred to the respective group of said originating registers by examining the call signal receiver group identity contained in said respective group of originating registers.

14. In a program-controlled telephone switching system the combination comprising a plurality of lines, a plurality of call signal receivers, means for connecting one of said call signal receivers to a line requesting service, a plurality of originating registers each permanently associated with a respective one of said call signal receivers, and means for inserting into each of said originating registers the identity of the line connected to the respective permanently associated call signal recovery and for transferring call signaling information from said call signal receivers to respective ones of said originating receivers.

15. In a program-controlled telephone switching system the combination comprising a plurality of lines, a plurality of call signal receivers, means for connecting one of said call signal receivers to a line requesting service, means for scanning said call signal receivers to detect call signaling information transmitted to said call signal receivers from the connected lines, a plurality of originating registers, and means for accumulating in said originating registers the call signaling information detected by said scanning means.

16. In a program-controlled telephone switching system, the combination in accordance with claim 15 wherein each of said originating registers is permanently associated with a respective one of said call signal receivers and wherein said scanning means simultaneously scans a group of said call signal receivers to control the accumulation of call signaling information in the respective group of said originating registers.

17. A method of accumulating call signaling information in a program-controlled telephone switchng system comprising the steps of (1) scanning the lines in said switching system for service requests, (2) assigning one of a plurality of originating registers to any line requesting service, (3) connecting one of a plurality of call signal receivers to said any line, said one call signal receiver being permanently associated with said one originating register assigned to said any line, (4) simultaneously scanning a group of said call signal receivers for call signaling information, groups of said call signal receivers being scanned sequentially, and (5) up-dating the group of originating registers permanently associated with the group of scanned call signal receivers in accordance with the call signaling information determined by said call signal receiver scanning.

18. In a program-controlled telephone switching system having a plurality of groups of call signal receivers and a plurality of respective groups of originating registers, each group of said originating registers containing the identity of the respective group of said call signal receivers, each of said originating register being permanently associated with one of said call signal receivers, the method of accumulating call signaling information comprising the steps of (1) assigning one of said originating registers to a line requesting service, (2) establishing a connection between said line and the call signal receiver permanently associated with the assigned originating register, (3) sequentially examining groups of said originating registers to determine the identities of the respective groups of said call signal receivers, and (4) sequentially examining groups of said call signal receivers for call signaling information in accordance with the call signal receiver group identities contained in said groups of originating registers for updating said groups of originating registers in accordance with the call signaling information in the respective groups of said call signal receivers.

19. A method of accumulating call signaling information in a program-controlled telephone switching system comprising the steps of (1) assigning one of a plurality of originating registers to any line requesting service, (2) connecting one of a plurality of call signal receivers to said any line, said one call signal receiver being permanently associated with said one originating register assigned to said any line, (3) simultaneously scanning a group of said call signal receivers for call signaling information, groups of said call signal receivers being scanned sequentially, and (4) up-dating the group of originating registers permanently associated with the group of scanned call signal receivers in accordance with the call signaling information determined by said call signal receiver scanning.

20. In a program-controlled telephone switching system having a plurality of call signal receivers and a plurality of originating registers each permanently associated with one of said call signal receivers the method of accumulating call signaling information comprising the steps of (1) assigning one of said originating registers to a line requesting service, (2) establishing a connection between said line and the call signal receiver permanently associated with the assigned originating register, and (3) sequentially up-dating groups of said originating registers by examining the call signaling information transmitted to the respective groups of said call signal receivers.

21. A method of accumulating call signaling information in a program-controlled telephone switching system comprising the steps of (1) establishing a connection between a line requesting service and one of a plurality of call signal receivers, (2) scanning said call signal receivers for call signaling information, and (3) up-dating a plurality of originating registers in accordance with the call signaling information determined by said scanning.

22. A method of accumulating call signaling information in a program-controlled telephone switching system in accordance with claim 21 wherein each of said originating registers is uniquely assigned to a respective one of said call signal reecivers and wherein the up-dating of each of said originating registers is in accordance with the call signaling information determined by the scanning of the respective call signal receiver to which said each originating register is uniquely assigned.

23. A method of accumulating call signaling information in a program-controlled telephone switching system in accordance with claim 22 wherein the scanning of said call signal receivers is in groups, with groups of said originating registers being up-dated in accordance with the call signaling information determined by the scanning of respective groups of said call signal receivers.

References Cited

UNITED STATES PATENTS

| | | | |
|---|---|---|---|
| 2,851,534 | 9/1958 | Bray et al. | 179—18 |
| 3,299,437 | 1/1967 | Schauer et al. | 179—18 |
| 3,349,188 | 10/1967 | Stirling et al. | 179—18 |

WILLIAM C. COOPER, *Primary Examiner.*